Figure 1:
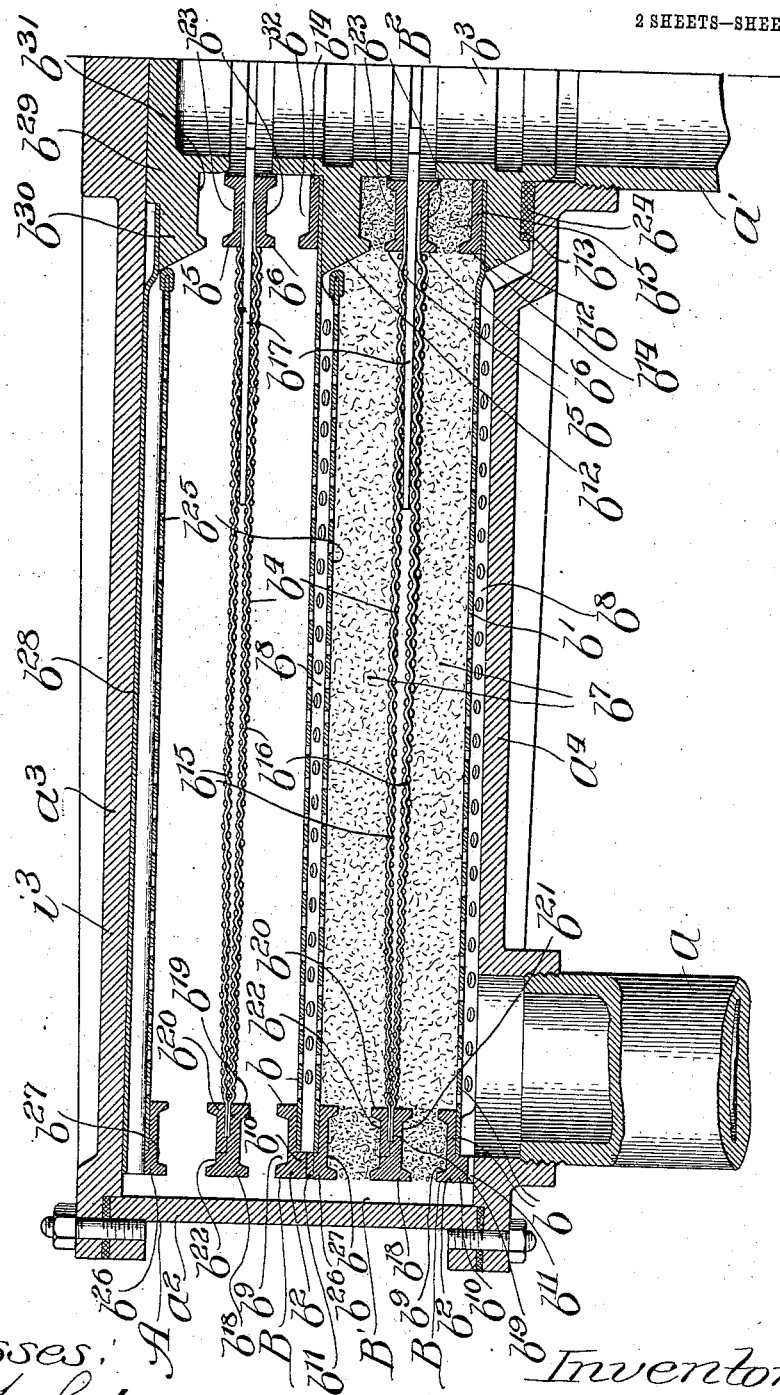

No. 849,017. PATENTED APR. 2, 1907.
J. T. H. PAUL.
FILTER.
APPLICATION FILED OCT. 25, 1906.

2 SHEETS—SHEET 1.

Witnesses:
Inventor:
John T. H. Paul,

No. 849,017. PATENTED APR. 2, 1907.
J. T. H. PAUL.
FILTER.
APPLICATION FILED OCT. 25, 1906.
2 SHEETS—SHEET 2.
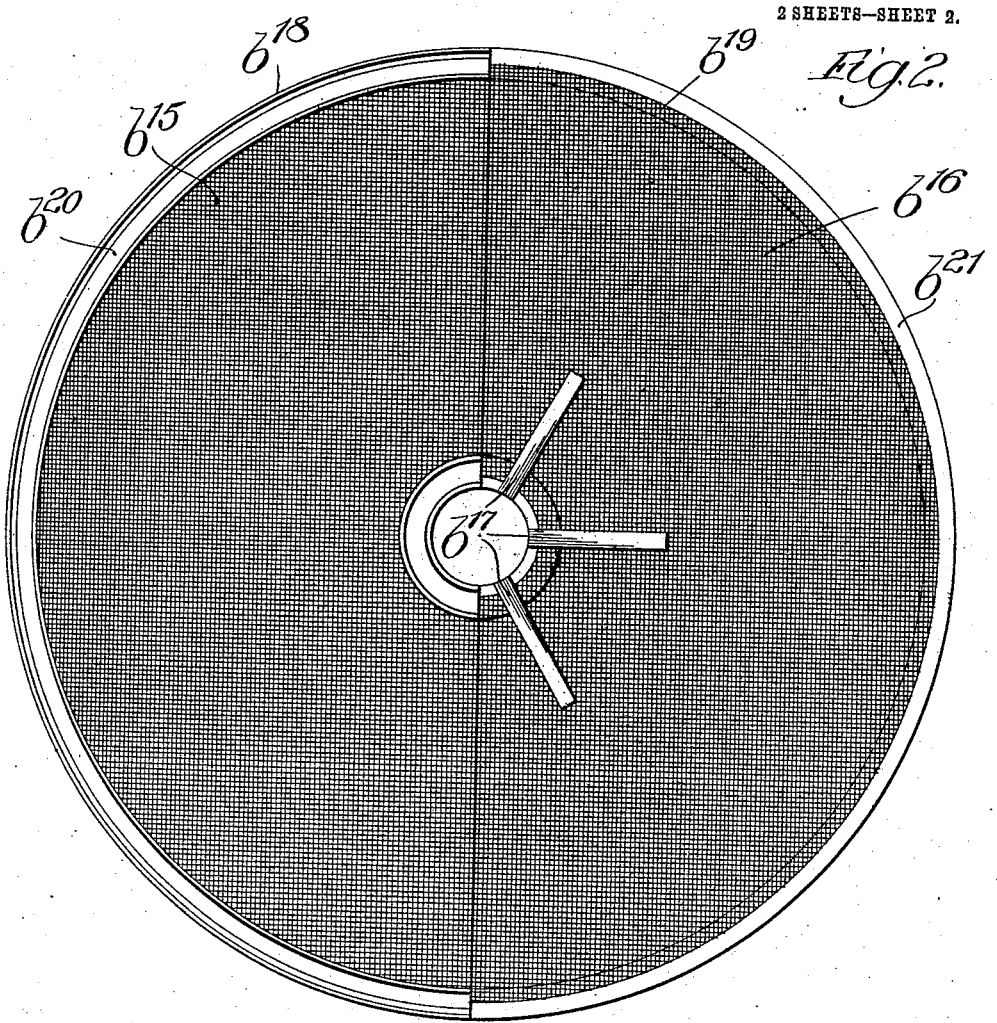
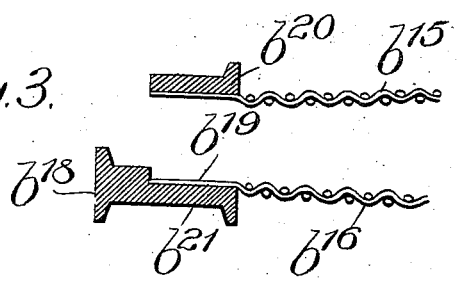
Witnesses:
Inventor:
John T. H. Paul,

UNITED STATES PATENT OFFICE.

JOHN T. H. PAUL, OF CHICAGO, ILLINOIS, ASSIGNOR TO E. GOLDMAN & CO., OF CHICAGO, ILLINOIS, A CORPORATION OF ILLINOIS.

FILTER.

No. 849,017.      Specification of Letters Patent.      Patented April 2, 1907.

Application filed October 25, 1906. Serial No. 340,480.

*To all whom it may concern:*

Be it known that I, JOHN T. H. PAUL, a citizen of the United States, residing at Chicago, in the county of Cook and State of Illinois, have invented a new and useful Improvement in Filters, of which the following is a specification.

This invention relates particularly to filters for use in filtering liquors; and the primary object of the invention is to provide a filter of simple construction having a large capacity and thoroughly effective to cleanse the liquor passing through it.

The invention is illustrated in its preferred embodiment in the accompanying drawings, in which—

Figure 1 represents a broken sectional view of the improved filter; Fig. 2, a plan view of a collector element employed in the filter, one member of the collector element having one-half thereof removed to expose the spacing devices located between the members of the collector element; and Fig. 3, a broken sectional view indicating the manner of joining the members or screens of the collector element together.

The filter comprises in its preferred embodiment a casing A, supplied with an inlet-passage $a$ near the periphery of its bottom and with an outlet $a'$ at the center of its bottom and filter-cells B, contained in the casing and forming therewith an annular chamber B', the cells having a central conduit $B^2$, which communicates with the central outlet-passage $a'$ of the casing.

The casing A may be of any improved construction. As shown, it comprises a cylinder $a^2$, externally flanged at its ends, and top and bottom ends $a^3$ $a^4$, respectively detachably connected with the cylinder. Each cell B comprises a comparatively shallow circular pan $b$, having a perforate bottom $b'$ and equipped with a peripheral packing-ring $b^2$, a conduit-section $b^3$, fitted in a central perforation with which the perforate bottom $b$ is provided, a collector element $b^4$, having conduit-sections $b^5$ $b^6$, fitted in a central opening with which the collector element is provided, and filter material $b^7$ above and below the collector element $b^4$. The perforate bottom $b'$ is provided with radial corrugations $b^8$, serving to afford channels through which the liquor may pass from the annular space B' and be distributed with relation to the filter material.

The peripheral packing-rings $b^2$ of the pan or distributer element $b$ affords a binding member for the periphery of the distributer element, having a recess on its lower side, which receives the flattened periphery of said element. The upper side of the packing-ring is provided with an annular recess $b^9$, in which filter material may be compacted so tightly as to practically prevent passage of liquor. Said packing-ring is provided with a downturned flange $b^{10}$, having radial grooves or passages $b^{11}$, through which liquor may pass from the annular chamber B'. Each conduit-section $b^3$ is provided externally between its ends with a flange $b^{12}$, having its lower side provided with an annular recess $b^{13}$. Upon said flange rests the inner flattened periphery of the corrugated bottom $b'$ of the distributer element $b$, and fitted upon the upper portion of the conduit-section $b^3$ is a packing-ring $b^{14}$ with annular groove $b^{32}$. Each collector element $b^4$ comprises an upper screen $b^{15}$ and a lower screen $b^{16}$. (Shown separated in Fig. 3.) The conduit-sections $b^5$ $b^6$ are grooved on adjacent sides to provide for insertion of the inner periphery of the annular screens. The lower screen $b^{16}$ is equipped with radial spacing members $b^{17}$, which serve to preserve a space between the screens, through which the filtered liquor may pass to the central eduction-conduit. The lower screen is provided at its external periphery with a packing-ring $b^{18}$, which is provided with an annular recess $b^{19}$, which serves to receive a binding member $b^{20}$, with which the screen $b^{15}$ is equipped. The outer margins of the screens are confined between the members $b^{18}$ and $b^{20}$ within the space $b^{19}$. The packing-ring $b^{18}$ is provided on its lower surface with an annular recess $b^{21}$, and the formation of the upper surfaces of the members $b^{18}$ and $b^{20}$ is such as to provide an annular recess $b^{22}$ for packing material when the members $b^{18}$ and $b^{20}$ are together in the position shown in Fig. 1. When the member $b^{20}$ is fitted in the member $b^{18}$, the members are preferably joined, as by soldering. The conduit-sections $b^5$ $b^6$, which constitute also inner binding members for the screens, may be joined together to the inner margins of the screens by soldering the parts to the spacing members $b^{17}$. The spacing members extend between the conduit-sections $b^5$ $b^6$, so that the passages leading to the central conduit $B^2$ of the filter are provided. The conduit-sections $b^5$ $b^6$ are provided on their unopposed surfaces with annular recesses or grooves $b^{23}$.

The perforate radially-corrugated bottom of the lowermost distributer element or cell-pan $b$ rests upon the bottom of the filter-casing, spaces being preserved therebetween for the admission of liquid beneath said distributer element. The flange or packing-ring $b^{12}$ of the lowermost distributer element bears upon a gasket $b^{24}$, which is slipped upon the conduit-sections $b^3$ and bears upon the bottom of the filter-casing. The conduit-sections $b^5$ $b^6$ telescope with the conduit-sections $b^3$, as shown. Over the top of the filter mass above each collector element $b^4$ is placed a perforate plate or screen $b^{25}$, having a central opening sufficiently large to receive the external flange $b^{12}$ of the next superposed distributer element $b$. The outer margin of the perforate plate $b^{25}$ is equipped with a packing-ring $b^{26}$, having an annular channel $b^{27}$ on its lower surface. The drawings illustrate a filter having only a few cells; but it will be understood that as many cells may be employed in any filter as are desired. The arrangement is such that alternate distributer elements and collector elements are employed, said elements having packing-rings at their inner and outer peripheries opposed to each other, the elements being spaced to receive suitable masses of filter material between them. In packing the filter the filter masses are extended between the packing-rings, so that the filter material will be tightly compacted between the packing-rings, thereby practically providing against the passage of liquor except through the channels provided, the arrangement being such that these passages are always kept open. Above the uppermost perforate plate $b^{25}$ and beneath the casing-top $a^3$ is confined a radially-corrugated member $b^{28}$, whose central portion is equipped with a conduit-section $b^{29}$, which telescopes with the uppermost conduit-section $b^5$, said conduit-section $b^{29}$ being provided with an external flange $b^{30}$, whose lower surface is provided with a recess $b^{31}$, the flange $b^{30}$ serving as a packing-ring opposed to the adjacent ring $b^5$. The formation of the conduit-section is such as to close the top of the central conduit $B^2$.

It will now be understood that when the filter parts are assembled as shown in Fig. 1 the liquor may pass from the annular chamber $B'$ through the grooves $b^{11}$ at the base portions of the packing-rings $b^2$ of the distributer elements, thence along the radial corrugations of the distributer elements and through the perforations therein and through the filter masses to the collector elements $b^4$, through which the liquor escapes through the central conduit $B^2$. As stated, the filter masses are tightly compacted between the inner and outer packing-rings of the cells, so that if any liquor were to pass through the closely-compacted masses between the said rings it would be effectively filtered. It will be understood that by reason of the telescopic connection between the conduit-sections at the center of the filter considerable latitude is allowed for compacting the filter masses in the cells when the parts are drawn together by means of bolts or by any other well-known means.

The present invention constitutes an improvement upon the filter disclosed in my Patent No. 834,637, granted October 30, 1906, and is directed more particularly to the employment of packing-rings or compression-rings at the outer peripheries of the distributer and collector elements and the compacting of the filter masses thereat, thus providing for a more ready and more uniform establishment of the joints at those points which are to be rendered practically impervious to the passage of the liquor.

What I regard as new, and desire to secure by Letters Patent, is—

1. In a filter, the combination of a casing provided with an inlet and having a central outlet, and filter-cells within the casing and forming therewith an annular chamber, the filter-cells being constructed with telescoping central conduit-sections and distributer and collector elements equipped at their external peripheries with packing-rings, and filter masses extending between and compacted between said packing-rings, for the purpose set forth.

2. In a filter, the combination of a casing provided with a central outlet, distributer elements equipped at their outer peripheries with packing-rings and having passages through which liquor may gain access to the distributer elements, collector elements equipped at their outer peripheries with packing-rings opposed to said first-named packing-rings and filter material confined between the distributer and collector elements and compacted between said packing-rings.

3. In a filter, the combination of a casing having a central outlet-passage, and cells within said casing and forming therewith an annular chamber, and comprising distributer elements equipped centrally with conduit-sections and at their external peripheries with packing-rings, collector elements equipped centrally with conduit-sections telescoping with said first-named conduit-sections and equipped at their external peripheries with packing-rings, and filter masses confined between said distributer elements and collector elements and compacted between said packing-rings, for the purpose set forth.

4. In a filter, the combination of a casing provided at its bottom with a central outlet-passage, a radially-corrugated perforate distributer element resting upon said bottom of said casing, and provided with a central conduit-section and equipped at its external periphery with a packing-ring, collector elements having a conduit-section telescoping with said first-named conduit-section and equipped at its external periphery with a packing-ring opposed to said first-named packing-ring, and filter material confined between said distributer and collector elements and compacted between said packing-rings, for the purpose set forth.

5. In a filter, a distributer element comprising a radially-corrugated perforate plate having a central opening, a conduit-section connected with said perforate plate at said central opening, and a packing-ring connected with the outer periphery of said perforate plate and having passages for admission of liquor to the channels formed by the corrugations of said plate.

6. In a filter, a distributer element comprising a radially-corrugated perforate plate having a central opening, a conduit-section fitted in said opening and equipped externally between its ends with a flange bearing against one surface of said plate, a packing-ring fitted on said conduit-section and bearing against the other surface of said plate, and a packing-ring connected with the outer periphery of said perforate plate and having a dependent flange provided with channels, for the purpose set forth.

7. In a filter, a collector element comprising a screen equipped centrally with conduit-sections formed to afford packing-rings, with passages extending between the packing-rings to admit liquor to the central conduit of the filter, and a packing-ring connected with the outer periphery of said collector element.

8. In a filter, a collector element comprising a pair of annular screens, spacing members between the screens at the inner peripheries thereof, conduit-sections applied to the inner margins of said screens and affording packing-rings, and a binding applied to the outer peripheries of said screens and affording packing-rings, for the purpose set forth.

9. In a filter, the combination of a casing having a central outlet-passage, distributer elements equipped at their outer peripheries with packing-rings having depending channeled flanges, collector elements equipped at their external peripheries with packing-rings, filter material confined between the distributer elements and collector elements, and screens adjacent to the intermediate distributer elements and equipped at their external peripheries with packing-rings opposed to the packing-rings of the collector elements.

JOHN T. H. PAUL.

In presence of—
J. H. LANDES,
C. W. WASHBURNE.